United States Patent
Chino

(10) Patent No.: US 9,161,001 B2
(45) Date of Patent: Oct. 13, 2015

(54) IMAGE CAPTURING APPARATUS THAT SUPPRESSES COLOR DEVIATION RESULTING FROM NOISE DUE TO TEMPERATURE AND EXPOSURE TIME

(71) Applicant: CANON KABUSHIKI KAISHA, Tokyo (JP)

(72) Inventor: Shunsuke Chino, Asaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 13/751,927

(22) Filed: Jan. 28, 2013

(65) Prior Publication Data

US 2013/0201362 A1  Aug. 8, 2013

(30) Foreign Application Priority Data

Feb. 2, 2012  (JP) .................. 2012-021345

(51) Int. Cl.
*H04N 9/73* (2006.01)
*H04N 5/235* (2006.01)

(52) U.S. Cl.
CPC .............. *H04N 9/735* (2013.01); *H04N 5/2352* (2013.01)

(58) Field of Classification Search
CPC ..... H04N 5/335; H04N 5/361; H04N 5/2176; H04N 5/357; H04N 5/3575; H04N 9/735
USPC ........... 348/223.1, 241, 243, 244, 251, 229.1, 348/362, 255
See application file for complete search history.

(56) References Cited

U.S. PATENT DOCUMENTS

| | | | |
|---|---|---|---|
| 8,223,226 B2 * | 7/2012 | Tsuruoka | 348/241 |
| 8,305,468 B2 * | 11/2012 | Sambongi | 348/241 |
| 8,421,882 B2 * | 4/2013 | Ueda et al. | 348/229.1 |
| 8,698,921 B2 * | 4/2014 | Park | 348/241 |
| 8,823,854 B2 * | 9/2014 | Yoshida | 348/333.01 |
| 8,860,854 B2 * | 10/2014 | Kato | 348/244 |
| 2002/0167600 A1 * | 11/2002 | Baer | 348/243 |
| 2006/0092297 A1 * | 5/2006 | Lee et al. | 348/241 |
| 2006/0227227 A1 * | 10/2006 | Tsuruoka | 348/241 |
| 2009/0167905 A1 * | 7/2009 | Ishibashi et al. | 348/241 |
| 2010/0188529 A1 * | 7/2010 | Tsuruoka | 348/234 |

FOREIGN PATENT DOCUMENTS

JP  05-091402  4/1993
JP  2010-273319  12/2010

* cited by examiner

*Primary Examiner* — Pritham Prabhakher
(74) *Attorney, Agent, or Firm* — Cowan, Liebowitz & Latman, P.C.

(57) ABSTRACT

An image capturing apparatus comprises an image sensor configured to photoelectrically convert incident light into an image signal and to output the image signal; an exposure time control unit configured to control exposure time when an image is sensed by the image sensor; a gain control unit configured to control a gain to be applied to the image signal; a temperature detection unit; and a color suppression unit configured to determine, from at least one of the exposure time and the temperature, a noise level that changes with the exposure time and the temperature and to suppress, on the basis of a level of color deviation that corresponds to the determined noise level and of the gain, a color component of the image signal so that the color deviation is reduced.

3 Claims, 7 Drawing Sheets

BEFORE COLOR SUPPRESSION

AFTER COLOR SUPPRESSION

IMAGE CAPTURING APPARATUS THAT SUPPRESSES COLOR DEVIATION RESULTING FROM NOISE DUE TO TEMPERATURE AND EXPOSURE TIME

BACKGROUND OF THE INVENTION

1. Field of the Invention

The present invention relates to an image capturing apparatus and a method for controlling the image capturing apparatus, and in particular to an image capturing apparatus that suppresses color deviation resulting from noise due to temperature and exposure time, and a method for controlling the image capturing apparatus.

2. Description of the Related Art

In conventional image capturing apparatuses, suppression of noise due to gain, temperature and exposure time, and white balance (WB) correction are controlled.

Such suppression control of noise due to gain is described in, for example, Japanese Patent Laid-Open No. 5-91402, in which, when video signals obtained by an image sensing element are displayed, noise components of a color signal of the video signals are suppressed on the basis of information on the gain determined based on a photometric value.

Further, Japanese Patent Laid-Open No. 2010-273319 discloses that a captured image is divided into sub-regions, and for each sub-region and each color component, a standard deviation of image signals in each pixel is calculated, and a region in the captured image which is subjected to the calculation of a WB gain is extracted on the basis of a comparison result between the calculated standard deviation and a noise model.

Although there are cases where noise causes color deviation depending on temperature and exposure time, and an image with colors different from those of the actual object results, the conventional techniques such as Japanese Patent Laid-Open Nos. 5-91402 and 2010-273319 have not corrected the color deviation caused by noise.

SUMMARY OF THE INVENTION

The present invention has been made in consideration of the above situation, and is to improve color reproducibility regardless of temperature and exposure time.

According to the present invention, provided is an image capturing apparatus comprising: an image sensor configured to photoelectrically convert incident light into an image signal and to output the image signal; an exposure time control unit configured to control exposure time when an image is sensed by the image sensor; a gain control unit configured to control a gain to be applied to the image signal that is output from the image sensor; a temperature detection unit; and a color suppression unit configured to determine, from at least one of the exposure time controlled by the exposure time control unit and the temperature detected by the temperature detection unit, a noise level that changes with the exposure time and the temperature and to suppress, on the basis of a level of color deviation that corresponds to the determined noise level and of the gain controlled by the gain control unit, a color component of the image signal that is output from the image sensor so that the color deviation is reduced.

Further, according to the present invention, provided is an image capturing apparatus comprising: an image sensor configured to photoelectrically convert incident light into an image signal and to output the image signal; an exposure time control unit configured to control exposure time when an image is sensed by the image sensor; a gain control unit configured to control a gain to be applied to the image signal that is output from the image sensor; a temperature detection unit; and a white balance processing unit configured to perform white balance processing on the image signal that is output from the image sensor, wherein the white balance processing unit determines, from at least one of the exposure time controlled by the exposure time control unit and the temperature detected by the temperature detection unit, a noise level that changes with the exposure time and the temperature and to change, on the basis of a level of color deviation that corresponds to the determined noise level and of the gain controlled by the gain control unit, a correction coefficient to be used for the white balance processing so that the color deviation is reduced.

Furthermore, according to the present invention, provided is a method for controlling an image capturing apparatus, the method comprising: an image sensing step of photoelectrically converting incident light into an image signal and outputting the image signal; an exposure time controlling step of controlling exposure time when an image is sensed in the image sensing step; a gain controlling step of controlling a gain to be applied to the image signal that is output in the image sensing step; a temperature detecting step of detecting a temperature; and a color suppressing step of determining, from at least one of the exposure time controlled in the exposure time controlling step and the temperature detected in the temperature detecting step, a noise level that changes with the exposure time and the temperature, and suppressing, on the basis of a level of color deviation that corresponds to the determined noise level and of the gain controlled in the gain controlling step, a color component of the image signal that is output in the image sensing step so that the color deviation is reduced.

Further, according to the present invention, provided is a method for controlling an image capturing apparatus, the method comprising: an image sensing step of photoelectrically converting incident light into an image signal and outputting the image signal; an exposure time controlling step of controlling exposure time when an image is sensed in the image sensing step; a gain controlling step of controlling a gain to be applied to the image signal that is output in the image sensing step; a temperature detecting step of detecting a temperature; and a white balance correcting step of performing white balance processing on the image signal that is output in the image sensing step, wherein in the white balance correcting step, a noise level that changes with the exposure time controlled in the exposure time controlling step and the temperature detected in the temperature detecting step is determined from at least one of the exposure time and the temperature, and a correction coefficient to be used for the white balance processing is changed on the basis of a level of color deviation that corresponds to the determined noise level and of the gain controlled in the gain controlling step, so that the color deviation is reduced.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
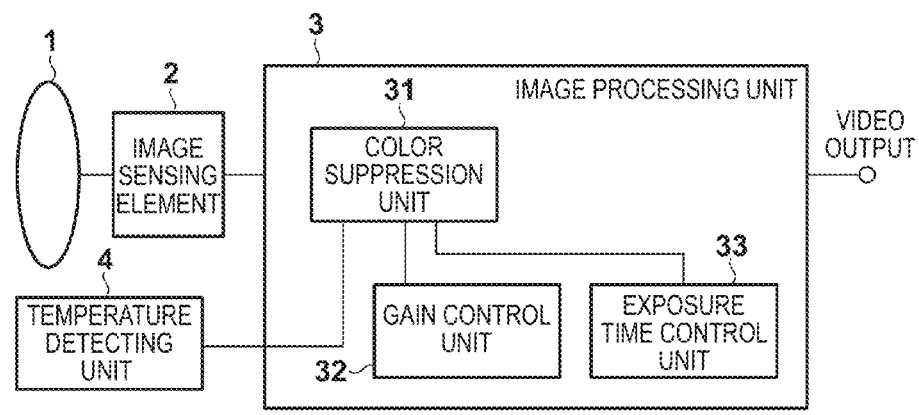
FIG. 1 is a block diagram schematically illustrating a configuration of an image capturing apparatus according to a first embodiment.

FIG. 1 is a block diagram schematically illustrating a configuration of an image capturing apparatus according to a first embodiment of the present invention, and in particular a configuration in which color suppression is performed according to gain, exposure time, and temperature.

In FIG. 1, incoming light that enters from an image capturing lens 1 is incident on a light-receiving surface of an image sensing element 2 for which CCD and CMOS sensors are typical examples, and the image sensing element 2 photoelectrically converts the incident light into an image signal and outputs the image signal. An image processing unit 3 performs, on the image signal that is output from the image sensing element 2, a variety of image processing, such as color conversion, AE processing, WB processing, gamma processing for converting gradation, electronic zooming, and electronic cutout. A temperature detecting unit 4, which is placed within the image capturing apparatus, detects the temperature in the image capturing apparatus or the temperature of the image sensing element 2. In the image processing unit 3, a color suppression unit 31 determines hue and saturation that are to be subjected to the color suppression, and a color suppression level, on the basis of information on gain obtained from a gain control unit 32, exposure time obtained from an exposure time control unit 33, and temperature obtained from the temperature detecting unit 4, and performs the color suppression processing.

Figure 2:
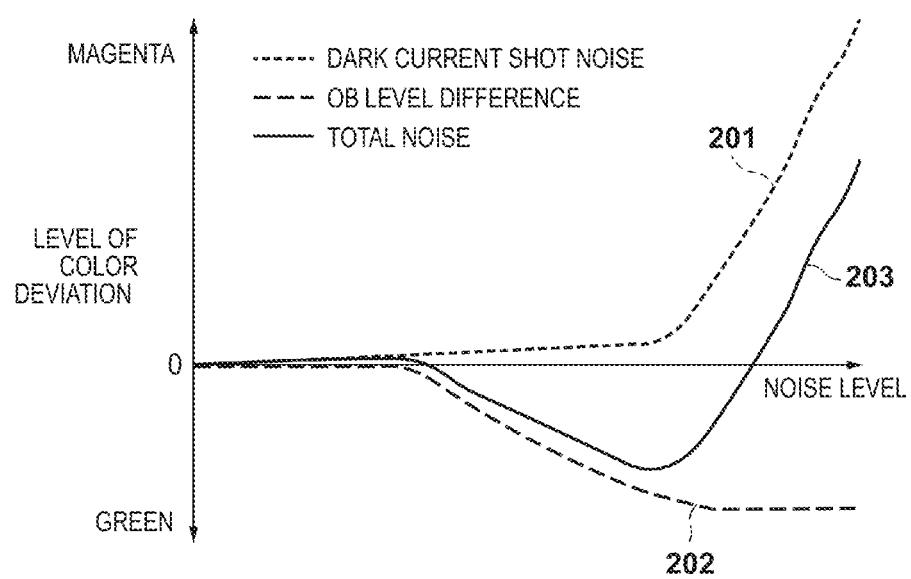
FIG. 2 is a diagram illustrating an influence of changes in noise due to temperature and exposure time.

The influence of noise on color will now be described with reference to FIG. 2. In FIG. 2, the horizontal axis denotes the noise level, whereas the vertical axis denotes the level of color deviation caused by the noise. The level of color deviation with respect to the noise level varies according to the individual characteristics of the image sensing element 2, and the image capturing apparatus according to the first embodiment holds a table that indicates characteristics as illustrated in FIG. 2 and is stored in advance in a storage unit (not illustrated). Note that the image capturing apparatus may hold, instead of the table, a function that indicates the characteristics as illustrated in FIG. 2 so as to calculate the level of color deviation with the use of the noise level. When the level of color deviation is in a positive direction of the vertical axis from zero as a reference point, the image is tinged with magenta, whereas when the level of color deviation is in a negative direction of the vertical axis from zero as a reference point, the image is tinged with green, and the greater the magnitude of the value is, the more significant the color deviation is. Further, in FIG. 2, the reference numeral 201 denotes the relationship between dark current shot noise, which is a noise resulting from a dark current, and color deviation. Further, the reference numeral 202 denotes the relationship between OB level difference and color deviation, the OB level difference being a noise due to a difference in level between a signal that was obtained in a situation in which an effective region of the image sensing element 2 was not exposed and a signal that was output from the OB (optical black) region.

Both the dark current shot noise and the OB level difference change with temperature and exposure time, and the noise levels of the dark current shot noise (Lv dark current) and the OB level difference (Lv OB level difference) can be expressed by the following formulae (1) and (2), respectively. Note that $\alpha$ and $\beta$ in the formulae (1) and (2) are coefficients that vary depending on the characteristics of the image sensing element 2.

$$Lv\ \text{dark current} = \alpha \times \text{Temperature } T + \beta \times \text{Exposure time } S \quad (1)$$

$$Lv\ OB\ \text{level difference} = \alpha \times \text{Temperature } T + \beta \times \text{Exposure time } S \quad (2)$$

Although in the present first embodiment both the dark current shot noise and the OB level difference are expressed using the same $\alpha$ and $\beta$, it should be noted that there are cases where $\alpha$ and $\beta$ are coefficients that are different for the dark current shot noise and the OB level difference.

Color deviations in hue and saturation due to the dark current shot noise and the OB level difference, which change with the temperature and the exposure time as illustrated in FIG. 2, are further emphasized by a gain value. The color deviation due to the total noise changes as indicated by a graph 203 of the total noise, which is the sum of the dark current shot noise and the OB level difference. Therefore, by determining, according to temperature and exposure time, a correction range (hue and saturation) that is adapted to the color deviation and performing color suppression on the color components constituting the image signal, it is possible to correct color deviation appropriately for the noise characteristics.

Figure 3:
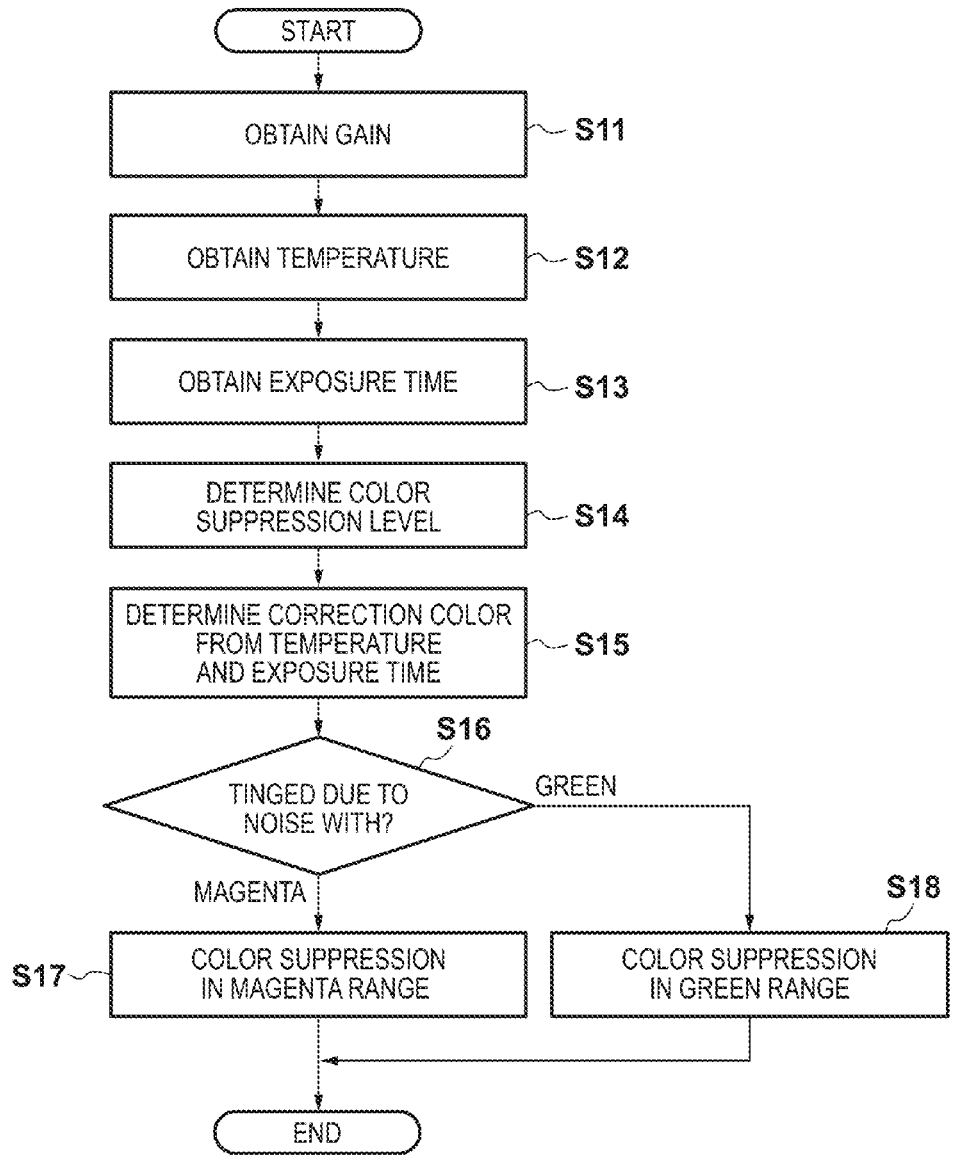
FIG. 3 is a flowchart illustrating correction processing according to the first embodiment.
Figure 4:
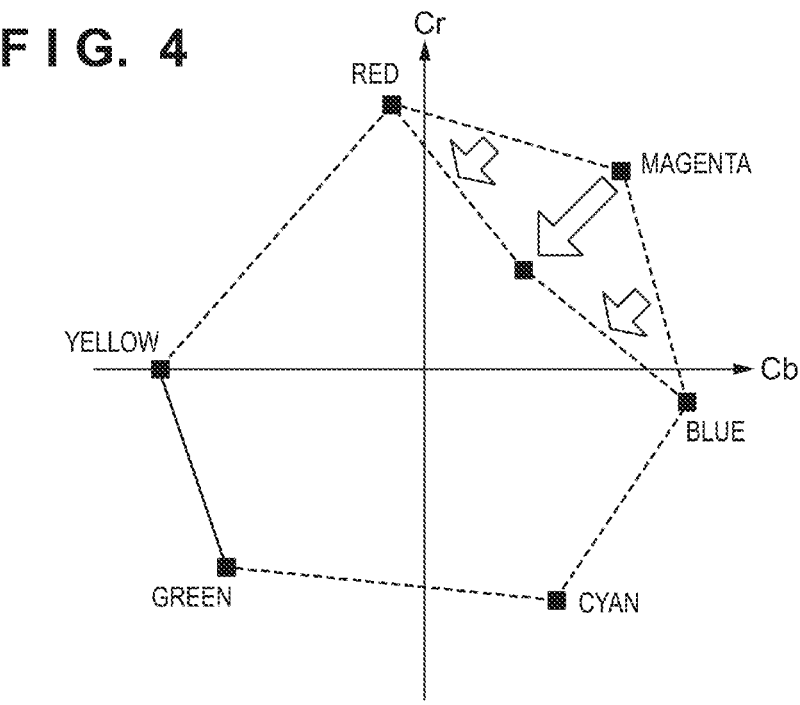
FIG. 4 is a diagram illustrating an example of color suppression control of magenta according to the first embodiment.
Figure 5:
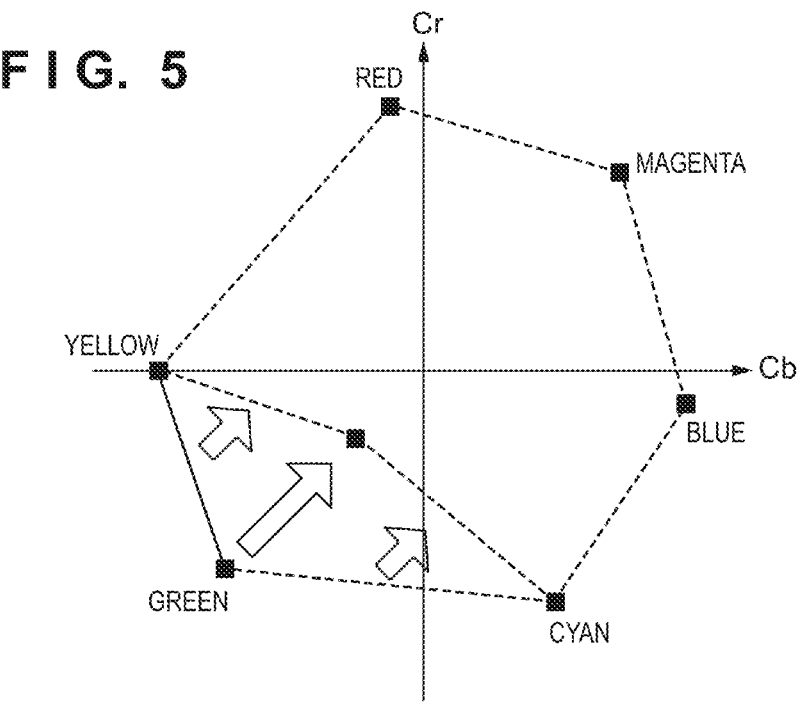
FIG. 5 is a diagram illustrating an example of color suppression control of green according to the first embodiment.

FIG. 3 is a flowchart illustrating correction processing performed in the color suppression unit 31 according to the first embodiment. In step S11, a gain is obtained from the gain control unit 32, in step S12, a temperature is obtained from the temperature detecting unit 4, and in step S13, exposure time is obtained by the exposure time control unit 33. Subsequently in step S14, a color suppression level is determined from the gain, the exposure time, and the temperature that were obtained. The color suppression level is determined in accordance with a level of color deviation. On the assumption that the levels of both the dark current shot noise (Lv dark current) and the OB level difference (Lv OB level difference), which are expressed by the formulae (1) and (2), are on the horizontal axis, a level of color deviation that has a characteristic indicated by the graph 203 corresponding to the total noise of the dark current shot noise and the OB level difference is read out from the storage unit. The level of color deviation that was read out is multiplied by the gain so as to obtain an ultimate level of color deviation. According to the ratio of the calculated level of color deviation, the color suppression level is determined. In step S15, depending on the sign of the level of color deviation that was read out, it is determined whether the image is tinged with magenta (+) or green (−) (step S16). If it is determined that the image is tinged with magenta due to noise, then in step S17, the color suppression according to the color suppression level determined in step S14 will be performed with respect to the color components in the magenta range (see FIG. 4). Whereas if it is determined that the image is tinged with green due to noise, then in step S18, the color suppression according to the color suppression level determined in step S14 will be performed with respect to the color components in the green range (see FIG. 5).

Figure 6A:
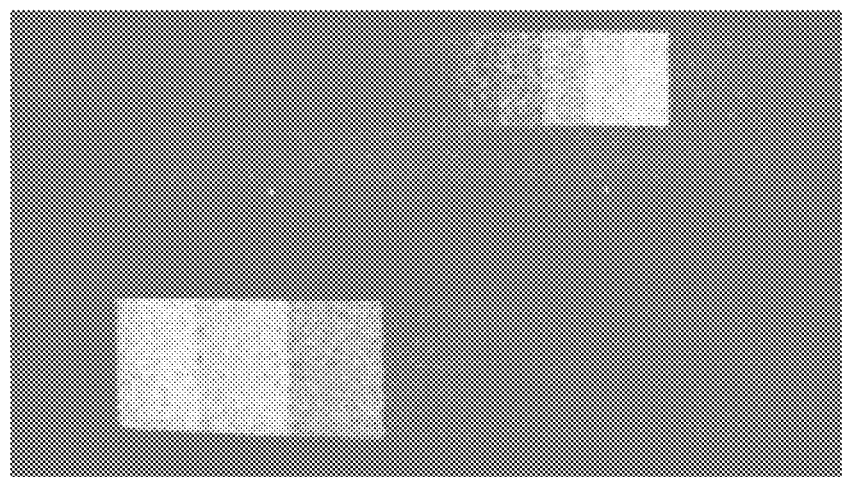
FIGS. 6A and 6B are diagrams illustrating a change between images caused by the color suppression according to the first embodiment.
Figure 6B:
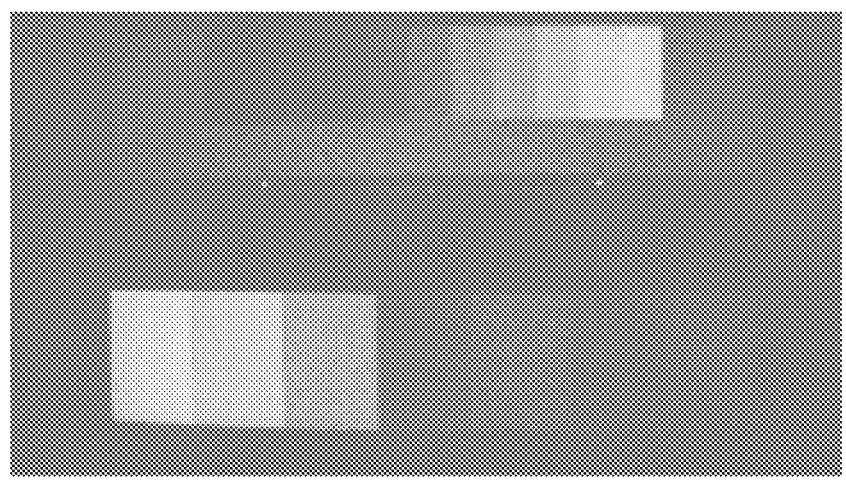

FIG. 6A illustrates a noisy image before performing the color suppression, and FIG. 6B illustrates an image obtained by performing the above-described color suppression processing on the noisy image before the color suppression. After the color suppression, although the saturation was reduced, noise could be removed, resulting in an image that is less noisy and well viewable.

Figure 7:
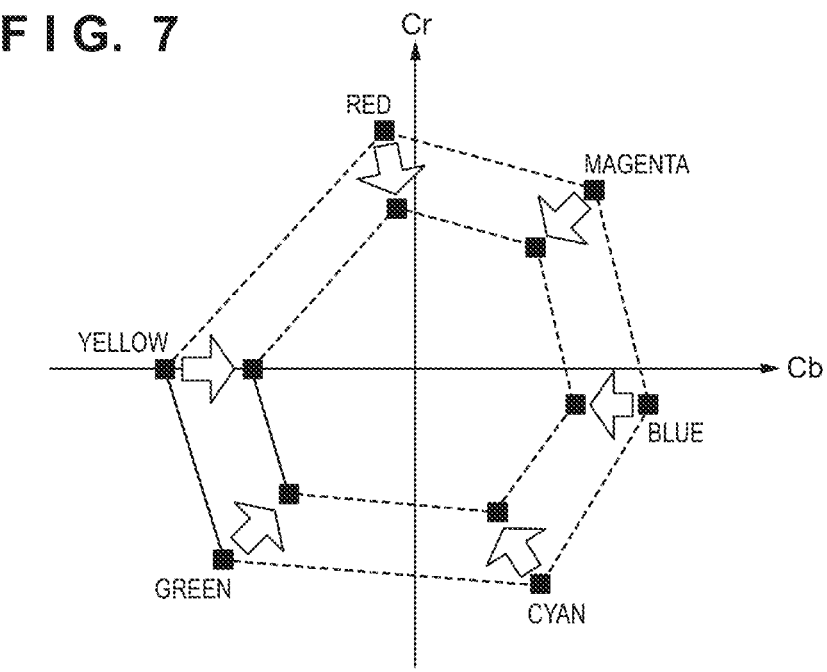
FIG. 7 is a diagram illustrating another example of color suppression control according to the first embodiment.

Further, since image sensing elements 2 have large individual differences, a table or function that corresponds to a uniform graph 203 cannot be applied to each and every correction, so that it is also possible to measure specifics due to temperature and exposure time for each image sensing element in advance and store an individual table or function for each image sensing element. If the measurement for each image sensing element is difficult, colors may be uniformly suppressed according to the level of color deviation as illustrated in FIG. 7 since even a uniform correction can reduce the color deviation.

As described above, according to the present first embodiment, it is possible to perform color suppression processing for reducing color deviation caused by noise regardless of gain, exposure time, and temperature, thereby allowing an improvement in color reproducibility.

Second Embodiment

Figure 8:
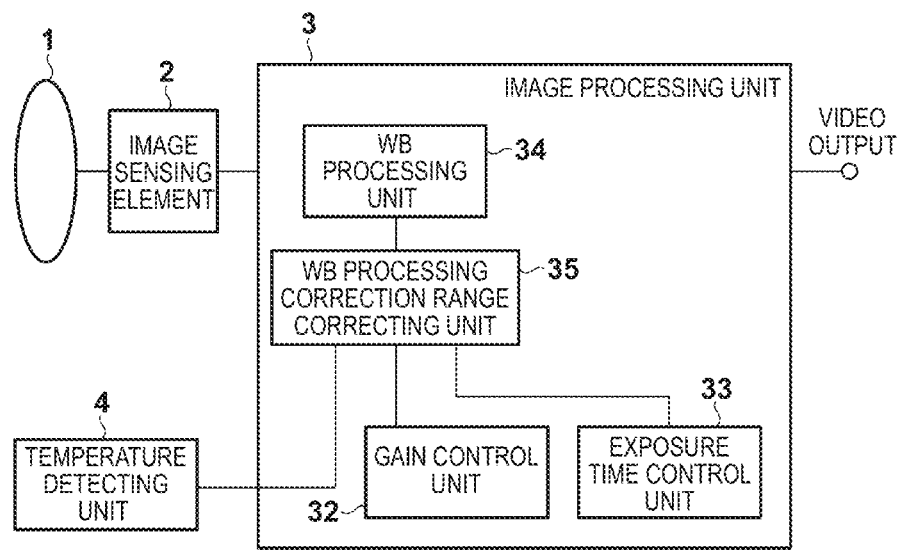
FIG. 8 is a block diagram schematically illustrating a configuration of an image capturing apparatus according to a second embodiment.

The second embodiment of the present invention will now be described. FIG. 8 is a block diagram schematically illustrating an image capturing apparatus according to the second embodiment, and in particular a configuration in which white balance processing (WB processing) control is performed according to gain, exposure time, and temperature.

The configuration illustrated in FIG. 8 differs from the above-mentioned configuration illustrated in FIG. 1 in that a WB processing unit 34 and a WB processing correction range correcting unit 35 are provided, instead of the color suppression unit 31 in FIG. 1. Since other components are equivalent to those of the configuration illustrated in FIG. 1, the same reference numerals are given to such components and further descriptions thereof are omitted.

In FIG. 8, the WB processing unit 34 performs WB processing on an image sensing signal that was output from the image sensing element 2. The WB processing correction range correcting unit 35 corrects a correction range that is to be subjected to the WB processing in the WB processing unit 34, on the basis of information on gain from the gain control unit 32, exposure time from the exposure time control unit 33, and temperature from the temperature detecting unit 4.

Figure 9:
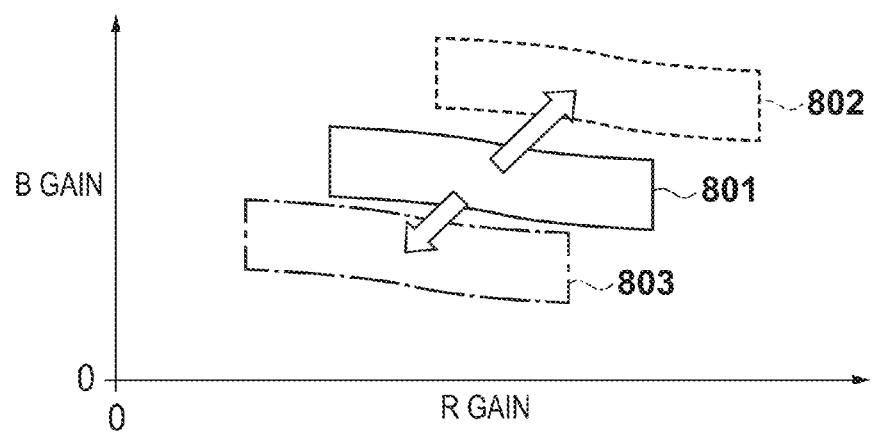
FIG. 9 is a diagram illustrating a correction range of WB processing according to the second embodiment.

As described in the first embodiment, the influence of noise on color deviation changes with exposure time and temperature as indicated in FIG. 2. FIG. 9 illustrates ranges (WB processing correction ranges) of values that gains (correction coefficients) for R and B components (referred to as R gain and B gain, respectively) can have in cases where an image is shown with R, G and B components and the WB processing is performed by multiplying the R and B components by R gain and B gain, respectively. The horizontal axis denotes R gain whereas the vertical axis denotes B gain, and the WB processing unit 34 adjusts R gain and B gain so as to perform a correction that is appropriate to the color of a light source. The reference numeral 801 indicates a WB processing correction range for room temperature and ordinary exposure time. The reason for setting this range for R gain and B gain is that if the range for R gain and B gain is too large, then chromatic colors under a light source such as incandescent light or fluorescent light may be corrected to white.

In the second embodiment, as with the first embodiment, color deviation due to noise is first determined from the total noise in the WB processing correction range correcting unit 35. And, when the image is tinged with green, the WB processing correction range is set such that both R gain and B gain are in a higher range 802, so that green is more reduced to white. In contrast, when the image is tinged with magenta, the WB processing correction range is set such that both R gain and B gain are in a lower range 803, so that magenta is more reduced to white. The ranges 802 and 803 vary according to the level of color deviation that has been described with reference to FIG. 2, and it is possible to correct R gain and B gain by mapping R gain and B gain within the WB processing correction range 801, which were calculated by the general WB correction processing, on the range 802 or 803.

Figure 10:
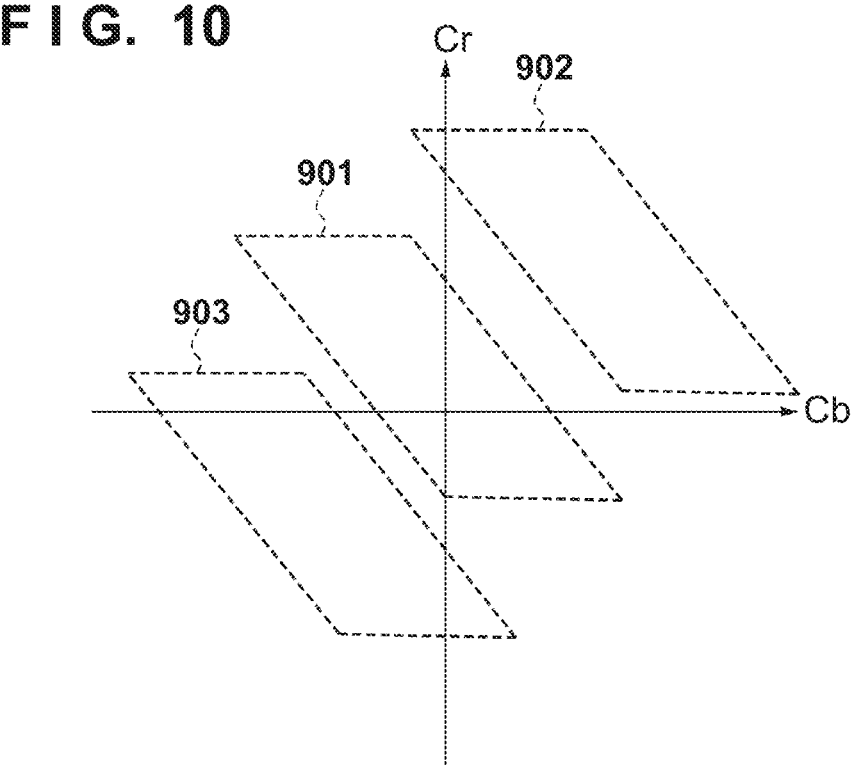
FIG. 10 is a diagram illustrating a white detection region for the WB processing according to the second embodiment.

Although the correction of the WB processing correction range has been described with reference to FIG. 9, it should be noted that the WB processing is processing in which a region estimated as white is detected and an image is processed using the gains for causing the detected region to be white. It is thus possible to further improve precision of the WB processing by changing a white detection range according to the color deviation due to noise, as illustrated in FIG. 10. That is, as illustrated in FIG. 10, on the assumption that the reference numeral 901 denotes the white detection range for room temperature and ordinary exposure time, the white detection range is changed to a region 902 that includes colors tinged with magenta with respect to white when the image is tinged with magenta. In contrast, the white detection range will be changed to a region 903 that includes colors tinged with green with respect to white when the image is tinged with green.

Figure 11:
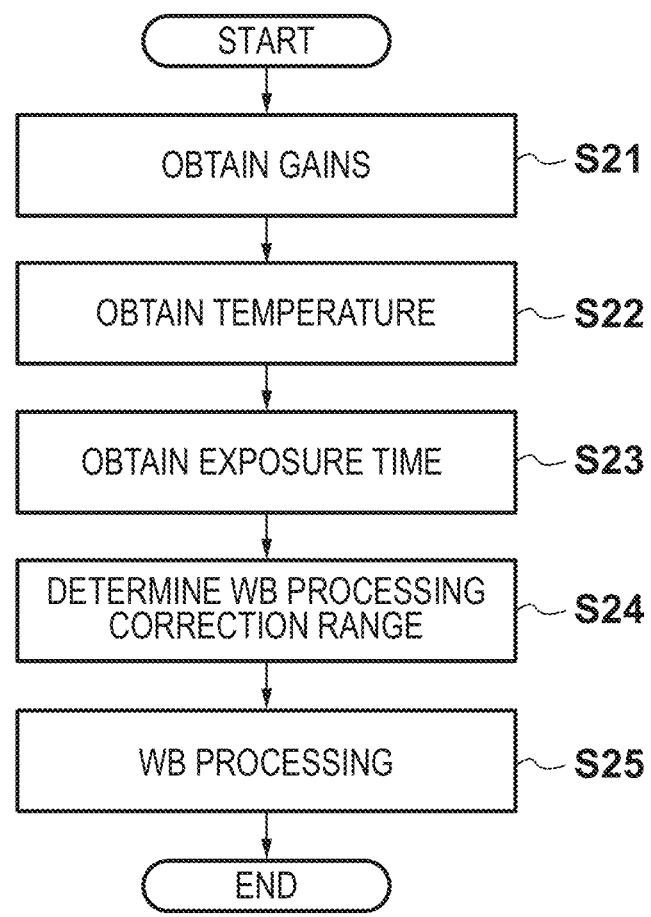
FIG. 11 is a flowchart illustrating correction processing according to the second embodiment.

The WB processing according to the present second embodiment, which is performed in the WB processing correction range correcting unit 35 and the WB processing unit 34, will now be described with reference to a flowchart of FIG. 11. The WB Processing correction range correcting unit 35 obtains gains from the gain control unit 32 in step S21, temperature from the temperature detecting unit 4 in step S22, and exposure time from the exposure time control unit 33 in step S23. Subsequently, in step S24, a WB processing correction range is set on the basis of the gains, the exposure time, and the temperature that were obtained, as illustrated in FIG. 9. In step S25, the WB processing unit 34 calculates R gain and B gain, and corrects R gain and B gain by mapping R gain and B gain on the WB processing correction range that was set in step S24, and performs the WB processing using the corrected R gain and B gain. Although it has been described that in step S24 a WB processing correction range is set, it should be noted that a function to be used for mapping R gain and B gain from the WB processing correction range 801 to the range 802 or 803 in FIG. 9 may be determined, instead.

As described above, according to the present second embodiment, it is possible to perform WB processing for reducing color deviation caused by noise regardless of gain, exposure time, and temperature, thereby allowing an improvement in color reproducibility.

Note that, although the first and second embodiments have described a case where both exposure time and temperature can be obtained, it is possible to improve color reproducibility, provided that at least one of the exposure time and temperature can be obtained, by treating the other value that cannot be obtained as zero in the above-described formulae (1) and (2).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-021345, filed on Feb. 2, 2012 which is hereby incorporated by reference herein in its entirety.

What is claimed is:

1. An image capturing apparatus comprising:
   an image sensor configured to photoelectrically convert incident light into an image signal and to output the image signal;
   an exposure time acquisition unit configured to acquire exposure time;
   a gain control unit configured to control a gain;
   a temperature detection unit configured to detect a temperature; and
   a color suppression unit configured to determine, from at least one of the exposure time multiplied by a first coefficient and acquired by the exposure time acquisition unit and the temperature multiplied by a second coefficient and detected by the temperature detection unit, a noise level that changes with the exposure time and the temperature and to suppress, on the basis of a level of color deviation that corresponds to the determined noise level and of the gain controlled by the gain control unit, a color component of the image signal that is output from the image sensor so that the color deviation is reduced,
   wherein the determined noise level is a sum of a noise level of a noise caused by a dark current and a noise due to a difference in levels between a signal obtained in a situation in which an effective region of the image sensor was not exposed and a signal output from an optical black region of the image sensor, and
   wherein the first coefficient and the second coefficient are determined according to characteristics of the image sensor;
   wherein the color component from the image sensor is suppressed based on color components within a predetermined range of colors corresponding to the color component.

2. The image capturing apparatus according to claim 1, further comprising a storage that stores characteristics of the level of color deviation that corresponds to the noise level, wherein the color suppression unit reads out from the storage unit the level of color deviation that corresponds to the determined noise level.

3. A method for controlling an image capturing apparatus, the method comprising:
   an image sensing step of photoelectrically converting incident light into an image signal and outputting the image signal;
   an exposure time acquisition step of acquiring exposure time;
   a gain controlling step of controlling a gain;
   a temperature detecting step of detecting a temperature; and
   a color suppressing step of determining, from at least one of the exposure time multiplied by a first coefficient and acquired in the exposure time acquisition step and the temperature multiplied by a second coefficient and detected in the temperature detecting step, a noise level that changes with the exposure time and the temperature, and suppressing, on the basis of a level of color deviation that corresponds to the determined noise level and of the gain controlled in the gain controlling step, a color component of the image signal that is output in the image sensing step so that the color deviation is reduced,
   wherein the determined noise level is a sum of a noise level of a noise caused by a dark current and a noise due to a difference in level between a signal obtained in a situation in which an effective region of an image sensor was not exposed and a signal output from an optical black region of the image sensor, and
   wherein the first coefficient and the second coefficient are determined according to characteristics of the image sensor;
   wherein the color component from the image sensor is suppressed based on color components within a predetermined range of colors corresponding to the color component.

\* \* \* \* \*